(12) United States Patent
He et al.

(10) Patent No.: US 9,619,342 B2
(45) Date of Patent: *Apr. 11, 2017

(54) BACK UP AND RECOVERY IN VIRTUAL MACHINE ENVIRONMENTS

(71) Applicant: International Business Machines Corporation, Armonk, NY (US)

(72) Inventors: Zhengwen He, Rochester, MN (US); Mandeep K. Jandir, San Jose, CA (US); James P. Smith, Redwood City, CA (US); Mark L. Yakushev, San Jose, CA (US); Christopher Zaremba, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 14/312,738

(22) Filed: Jun. 24, 2014

(65) Prior Publication Data

US 2015/0370639 A1    Dec. 24, 2015

(51) Int. Cl.
*G06F 12/00* (2006.01)
*G06F 11/14* (2006.01)

(52) U.S. Cl.
CPC ...... *G06F 11/1471* (2013.01); *G06F 11/1451* (2013.01); *G06F 11/1469* (2013.01);
(Continued)

(58) Field of Classification Search
CPC ............ G06F 11/1435; G06F 11/1451; G06F 11/1469; G06F 11/1471; G06F 11/1484;
(Continued)

(56) References Cited

U.S. PATENT DOCUMENTS

| | | | | |
|---|---|---|---|---|
| 7,549,027 B1* | 6/2009 | McAndrews | ....... | G06F 11/1469 707/999.202 |
| 8,099,391 B1* | 1/2012 | Monckton | ........... | G06F 11/1451 707/647 |

(Continued)

FOREIGN PATENT DOCUMENTS

| WO | 2011/082138 A1 | 7/2011 |
|---|---|---|
| WO | 2012/012365 A2 | 1/2012 |

OTHER PUBLICATIONS

He et al., "IBM Tivoli Storage Manager—Protecting Microsoft SQL Databases Hosted in VMware", Apr. 8, 2014, V1.0, © Copyright International Business Machines Corporation 2014, Grace Period Disclosure.

(Continued)

*Primary Examiner* — Charles Rones
*Assistant Examiner* — Nanci Wong
(74) *Attorney, Agent, or Firm* — Stephen R. Yoder; Fusheng Xu; Noah A. Sharkan

(57) ABSTRACT

Embodiments of the present invention provide efficient and cost-effective systems and methods for backing up and recovering a virtual machine and application data therein. Embodiments of the present invention can be used to satisfy near-zero RPOs by providing more recovery points for backups in virtual machine environments, while also providing increased granularity for recovery (i.e., single virtual disk, single file, etc.) and maintaining central management capabilities and back up efficiencies offered by virtual machine-level backups.

13 Claims, 8 Drawing Sheets

(52) U.S. Cl.
CPC .... *G06F 2201/80* (2013.01); *G06F 2201/815* (2013.01); *G06F 2201/84* (2013.01)

(58) Field of Classification Search
CPC ........... G06F 2201/80; G06F 2201/815; G06F 2201/84
See application file for complete search history.

(56) References Cited

U.S. PATENT DOCUMENTS

| | | | |
|---|---|---|---|
| 2007/0277012 A1* | 11/2007 | Hara | G06F 11/1448 711/162 |
| 2010/0011178 A1* | 1/2010 | Feathergill | G06F 11/1466 711/162 |
| 2010/0077160 A1* | 3/2010 | Liu | G06F 3/0482 711/162 |
| 2010/0077165 A1 | 3/2010 | Lu et al. | |
| 2012/0324183 A1 | 12/2012 | Chiruvolu et al. | |
| 2015/0212896 A1* | 7/2015 | Pawar | G06F 11/1448 707/648 |

OTHER PUBLICATIONS

Osuna et al., "SnapManager 2.0 for Virtual Infrastructure Best Practices", First Edition (Sep. 2010), SG24-7867-00, IBM Redbooks, International Technical Support Organization, pp. 1-118, © Copyright International Business Machines Corporation 2010.

Quintero et al., "Virtualization and Clustering Best Practicies Using IBM System p Servers", First Edition (May 2007), SG24-7349-00, IBM Redbooks, International Technical Support Organization, pp. 1-242, © Copyright International Business Machines Corporation 2007.

Sauvanet et al., "Tivoli Storage Manager for Virtual Environments—Data Protection for VMware Deployment Guide", IBM Redpaper™, International Technical Support Organization, First Edition (Nov. 2013), pp. 1-194, © Copyright International Business Machines Corporation 2013, <http://www.redbooks.ibm.com/redpapers/pdfs/redp4991.pdf>.

Sheng et al., "TH-CDP: An Efficient Block Level Continuous Data Protection System", 2009 IEEE International Conference on Networking, Architecture, and Storage, pp. 395-404, 978-0-7695-3741-2/09, © 2009 IEEE.

He et al., "Back Up and Recovery in Virtual Machine Environments", U.S. Appl. No. 14/472,418, filed Aug. 29, 2014.

IBM Appendix P, list of IBM patents or patent applications treated as related, Aug. 29, 2014.

* cited by examiner

BACK UP AND RECOVERY IN VIRTUAL MACHINE ENVIRONMENTS

STATEMENT REGARDING PRIOR DISCLOSURES BY THE INVENTOR OR A JOINT INVENTOR

The following disclosure(s) are submitted under 35 U.S.C. §102(b)(1)(A):

DISCLOSURE(S)

(1) Zhengwen He, Del Hoobler, Mandeep Jandir, Mimi Nguyen, Jim Smith, Omar Vargas, Mark Yakushev, and Chris Zaremba, "IBM Tivoli Storage Manager, Protecting Microsoft SQL Databases Hosted in VMware, V1.0," Apr. 8, 2014, IBM developerWorks®, https://www.ibm.com/developerworks/community/wikis/form/api/wiki/93193ba0-be33-4733-9b03-9ab823a7475c/page/36548a5d-a9df-4e5a-ae3a-eada9f2f37ee/attachment/ee3a9d09-9427-423e-938f-38cb8cafd9e8/media/Protecting%20Microsoft%20SQL%-20Databases%20in%20VMware%20V20140428.pdf.

BACKGROUND OF THE INVENTION

The present invention relates generally to the field of data backup systems, and more particularly to backup and recovery of data in virtual machine environments.

Backup and recovery systems are often designed and implemented according to one or more recovery point objectives (RPOs). An RPO is a maximum amount of data loss, measured in time, which a system designer is willing to tolerate if a data loss event should occur. For example, to meet an RPO of one hour, backups must be performed at a minimum interval of one hour. Where continuity of service and the ability to recover critical data are especially high, RPOs may approach near-zero, meaning that the backup and recovery system is implemented such that backups are taken so frequently that in the event of system failure, nearly no data would be lost.

Virtual machines are software-based emulations of computer systems. In the context of backup and recovery systems, virtual machines can provide efficiencies and cost savings because of their hardware-agnostic nature and for providing system administrators with the ability to deploy, operate, and manage multiple instances of virtual machines in a centralized fashion.

SUMMARY

Embodiments of the present invention provide systems, methods, and program products for backing up and recovering a virtual machine and application data therein, such that near-zero RPOs can be achieved, while also maintaining central management capabilities and backup efficiencies afforded by virtual machine-level backups. In one embodiment of the present invention, an application executing in a guest operating system in a virtual machine and log data associated with the application are identified for backup. A backup of the virtual machine is created and stored, and the backup of the virtual machine is confirmed to be stored on one or more storage devices in a data format that is compatible with backups of log data. A backup of log data is created and stored, and the backup of log data is related with the backup of the virtual machine in a relational data structure. Later, the related backups of the virtual machine and log data can be restored, and the log data can be applied to recover data at a particular recovery point.

DETAILED DESCRIPTION

Embodiments of the present invention provide efficient and cost-effective systems and methods for backing up and recovering a virtual machine and application data therein with increased numbers of recovery points, up to and including enough recovery points to achieve near-zero RPOs. Embodiments of the present invention provide systems and methods that utilize both periodic full backups of a virtual machine and more frequent backups of log data from applications of interest, such as transaction logs of database management applications. In this manner, as discussed in greater detail later in this specification, embodiments of the present invention can be used to satisfy near-zero RPOs by providing more recovery points for backups in virtual machine environments, while also providing increased granularity for recovery (i.e., single virtual disk, single file, etc.) and maintaining central management capabilities and backup efficiencies offered by virtual machine-level backups.

Figure 1:
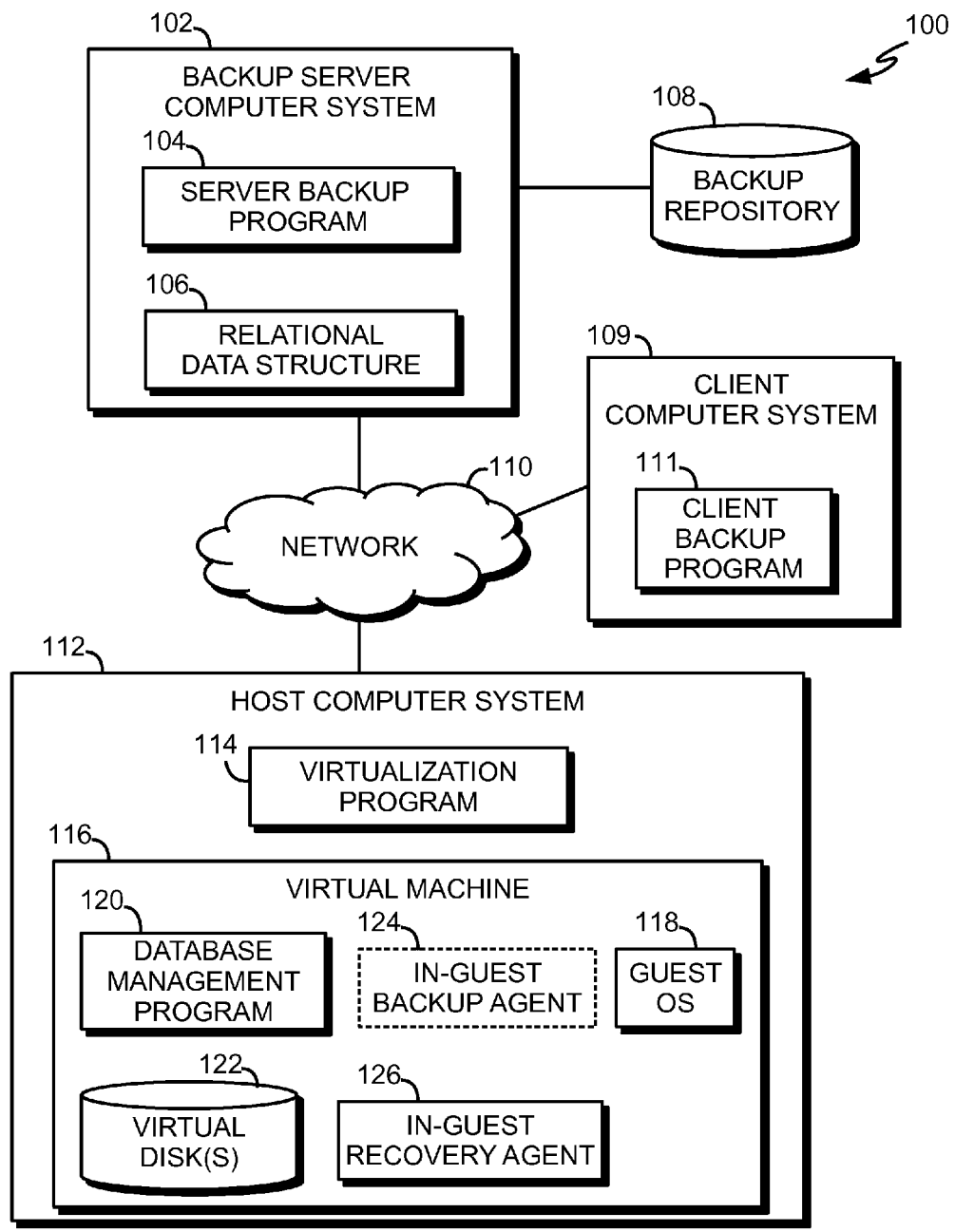
FIG. 1 is a block diagram of a backup system in accordance with an embodiment of the present invention.

FIG. 1 is a functional block diagram of backup system 100 in accordance with an embodiment of the present invention. Backup system 100 includes backup server computer system 102, host computer system 112, and client computer system 109. Backup server computer system 102, host computer system 112, and client computer system 109 can be desktop computers, laptop computers, specialized computer servers, or any other computer systems known in the art. In certain embodiments, backup server computer system 102, host computer system 112, and client computer system 109 represent computer systems utilizing clustered computers and components to act as a single pool of seamless resources when accessed through network 110. For example, such embodiments may be used in data center, cloud computing, storage area network (SAN), and network attached storage (NAS) applications. In certain embodiments, backup server computer system 102, host computer system 112, and client computer system 109 represent virtual machines. In general, backup server computer system 102, host computer system 112, and client computer system 109 are representative of any electronic devices, or combination of electronic devices, capable of executing machine-readable program instructions, as described in greater detail with regard to FIG. 8.

Backup server computer system 102 includes server backup program 104, relational data structure 106, and backup repository 108. Server backup program 104 performs server-side backup operations to backup virtual machine 116 and data of database management program 120 executing within virtual machine 116, in accordance with embodiments of the present invention. Server backup program 104 stores received backup objects in backup repository 108. Server backup program 104 can be implemented with any suitable server backup software, such as Tivoli® Storage Manager products available from International Business Machines of Armonk, N.Y.

Relational data structure 106 is used by server backup program 104 to maintain backup object entries for each backup object stored in backup repository 108, and to group together backup object entries that are associated with a given backup version. In embodiments of the present invention, relational data structure 106 relates data objects from full backups of virtual machine 116 with data objects from backups of log data stored on virtual disk(s) 122, even if the data objects are stored in different namespaces. The phrase "full backup", as used herein with respect to virtual machine 116, refers collectively to a backup of all data objects of virtual machine 116, as well as any subsequent incremental backups of data objects of virtual machine 116 that have changed since that last backup of all of the data objects. For example, a full backup of virtual machine 116 may be comprised of a first backup of all data objects taken at t0, as well as incremental backups of data objects captured at t1 and t2 that have changed since t0. The terms "log" and "log data", as used herein, refer to log files created by applications that reflect changes to data that have occurred since a particular point in time, and which can be later applied to recover data as it existed at a particular point in time captured in the log files (e.g., transaction logs for SQL databases). Relational data structure 106 can be implemented using any database architecture known in the art such as, for example, a relational database, an object-oriented database, and/or one or more tables.

Backup repository 108, in which server backup program 104 stores backup objects, can be implemented using any non-volatile storage media known in the art. For example, backup repository 104 can be implemented with a tape library, optical library, one or more independent hard disk drives, or multiple hard disk drives in a redundant array of independent disks (RAID).

Network 110 can be, for example, a local area network (LAN), a wide area network (WAN) such as the Internet, or a combination of the two, and include wired, wireless, or fiber optic connections. In general, network 110 can be any combination of connections and protocols that will support communications between backup server computer system 102, client computer system 109, and host computer system 112, in accordance with a desired embodiment of the invention.

Client computer system 109 includes client backup program 111. Client backup program 111 communicates with virtualization program 114 and server backup program 104 via network 110 (e.g., using TCP/IP) to backup virtual machine 116 and data of database management program 120 to backup repository 108. Client backup program 111 can be implemented with any suitable program that is compatible with virtualization program 114 and server backup program 104. For example, where virtualization program 114 is implemented with a VMware® product and server backup program 104 is implemented with a Tivoli® Storage Manager product, client backup program 111 can be implemented with Tivoli® Storage Manager for Virtual Environments—Data Protection for VMware (DP for VMware), also available from International Business Machines of Armonk, N.Y. In other embodiments, client backup program 111 may reside on a different computer system, such as host computer system 112.

Host computer system 112 includes virtualization program 114 and virtual machine 116. Virtualization program 114 creates and manages virtual machine 116. Virtualization program 114 can be implemented with any suitable hypervisor (e.g., VMware® ESX/ESXi, Microsoft Hyper-V®, KVM, etc.) and as part of any suitable virtualization infrastructure that is compatible with server backup program 104 and client backup program 111, in accordance with embodiments of the present invention.

Virtual machine 116 includes guest operating system (OS) 118, database management program 120, virtual disk(s) 122, in-guest backup agent 124, and in-guest recovery agent 126. Guest operating system 118 can be implemented with any suitable operating system, such as Windows® or Linux®. Database management program 120 is in-guest software that creates and manages databases of data. Database management program 120 also creates and, during recovery, applies log data (i.e., transaction logs). Database management program 120 can be implemented with any suitable database software, such as Microsoft SQL Server.

Figure 3:
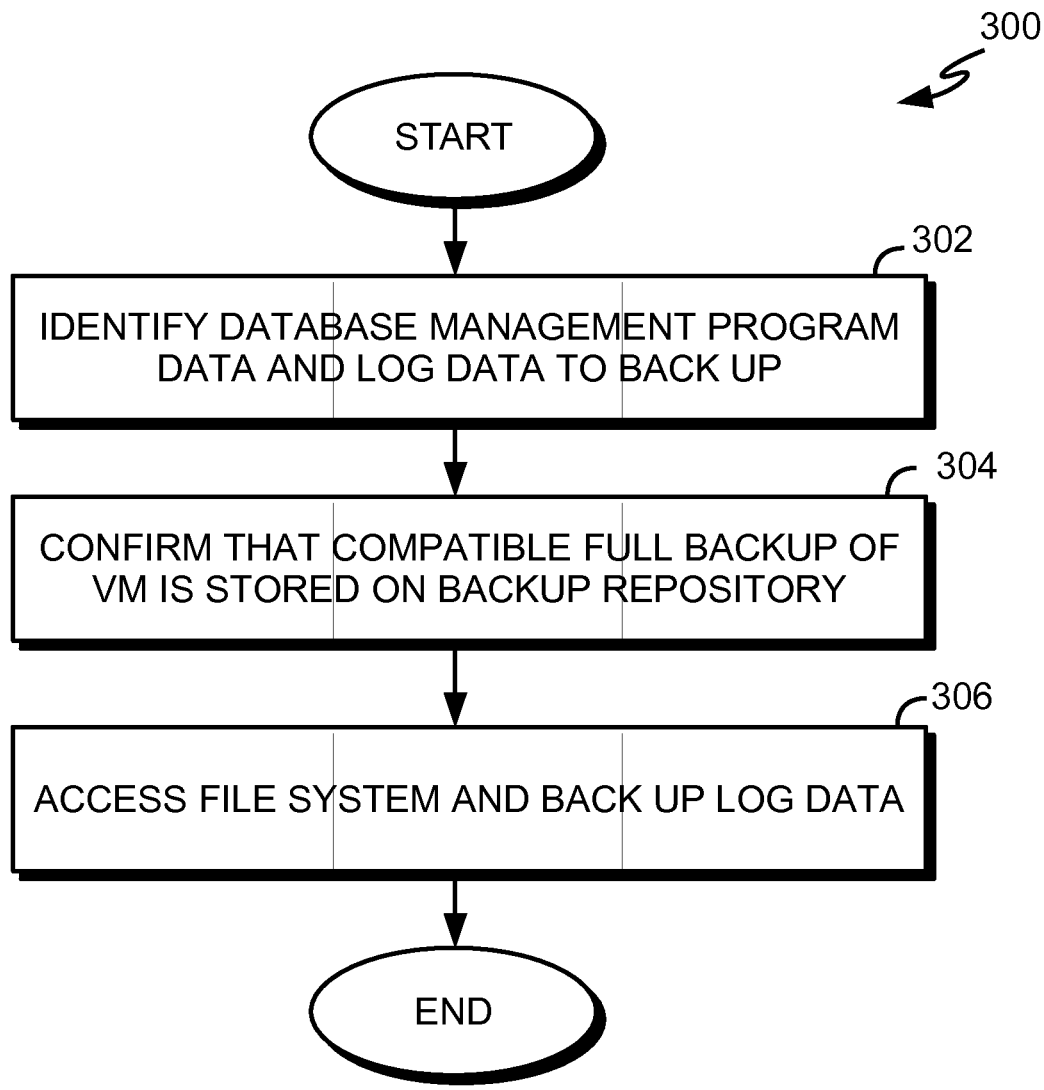
FIG. 3 is a flowchart illustrating operational steps for performing a backup of log data in a virtual machine in accordance with an embodiment.

In-guest backup agent 124 is optional in-guest software that is used to backup log data created by database management program 120 to backup repository 108, in accordance with certain embodiments of the present invention (e.g., the embodiment discussed with regard to FIG. 3). For example, where database management program 120 is implemented with Microsoft SQL Server, in-guest backup agent 124 may be implemented with Data Protection for SQL, available from International Business Machines of Armonk, N.Y. In other embodiments (e.g., the embodiments discussed with regard to FIGS. 4-6), in-guest backup agent 124 can be omitted, as indicated by dashed lines in FIG. 1.

Virtual disk(s) 122 are one or more virtualized hardware disk drives on which database management program 120 stores its databases, logs, and other application data. In certain embodiments, virtual disk(s) 122 comprise a plurality of disks mapped to different drives of the file system of guest operation system 118 (e.g., VMDK0 maps to a C: drive containing system/boot files, VMDK1 maps to a D: drive containing an SQL database, and VMDK2 maps to an L: drive containing SQL logs). Virtual disk(s) 122 may be a virtualized representation of one or more Advanced Technology Attachment (ATA), Serial ATA (SATA), Small Computer System Interface (SCSI), or Serial Attached SCSI (SAS) compatible hard disk drives. Virtual disk(s) 122 may also be a virtualized representation of a plurality of such hard disk drives in different configurations such as, for example, independent hard disk drives or as a plurality of hard disk drives in a redundant array of independent disks (RAID). In general, virtual disk(s) 122 may be a virtualized representation of any storage media known in the art.

Figure 7:
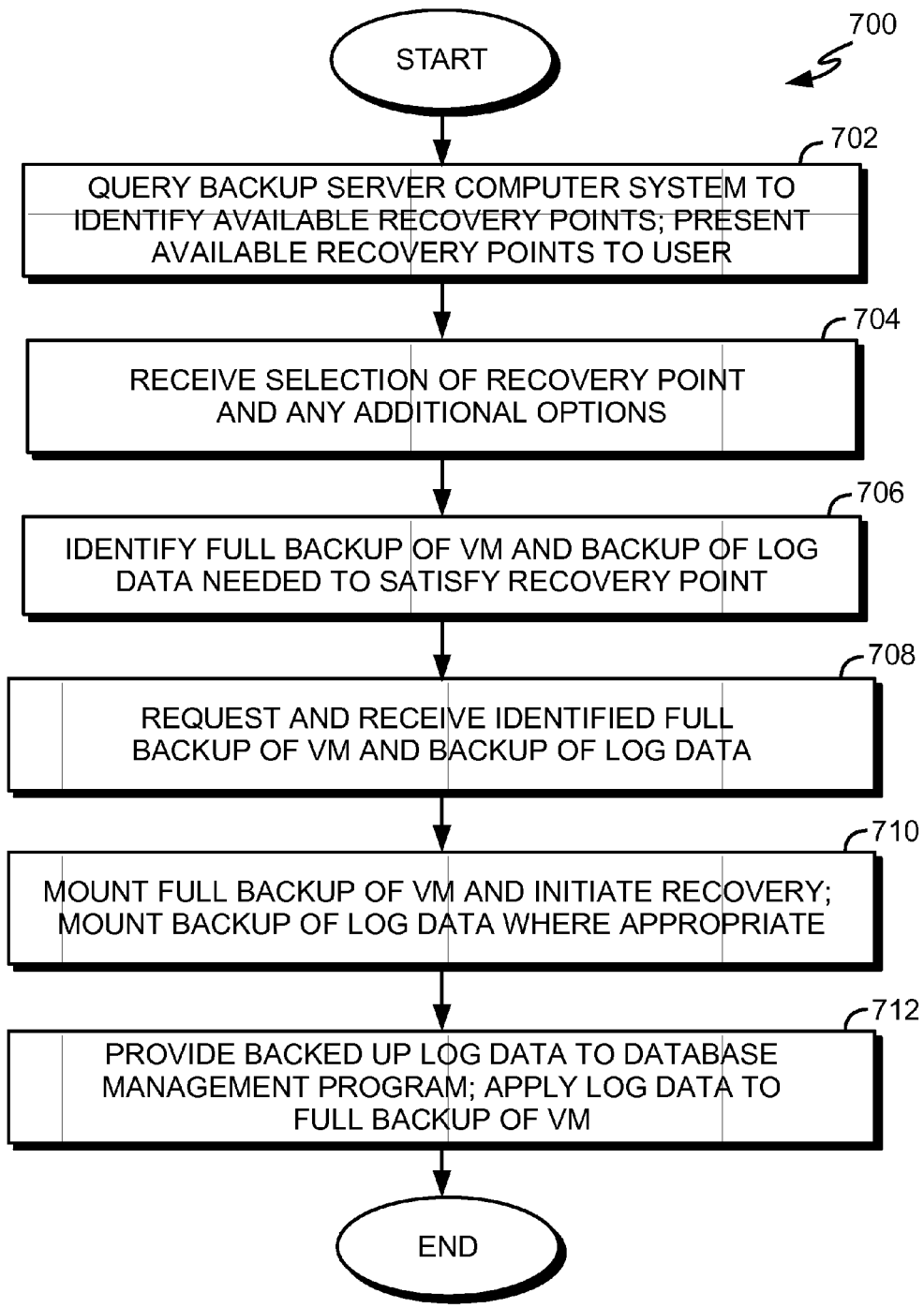
FIG. 7 is a flowchart illustrating operational steps for recovering application data in a virtual machine in accordance with an embodiment of the present invention.

In-guest recovery agent 126 is in-guest software that is used to initiate and facilitate recovery of backed up data from backup repository 108 to virtual disk(s) 122, as discussed in greater detail with regard to FIG. 7.

It should be understood that, for illustrative purposes, FIG. 1 does not show other computer systems and elements which may be present when implementing embodiments of the present invention. For example, while FIG. 1 shows a single host computer system 112 and a single virtual machine 116, backup system 100 can also include additional host computer systems 112 and virtual machines 116 that use backup server computing system 120 to back up their respective data.

Figure 2:
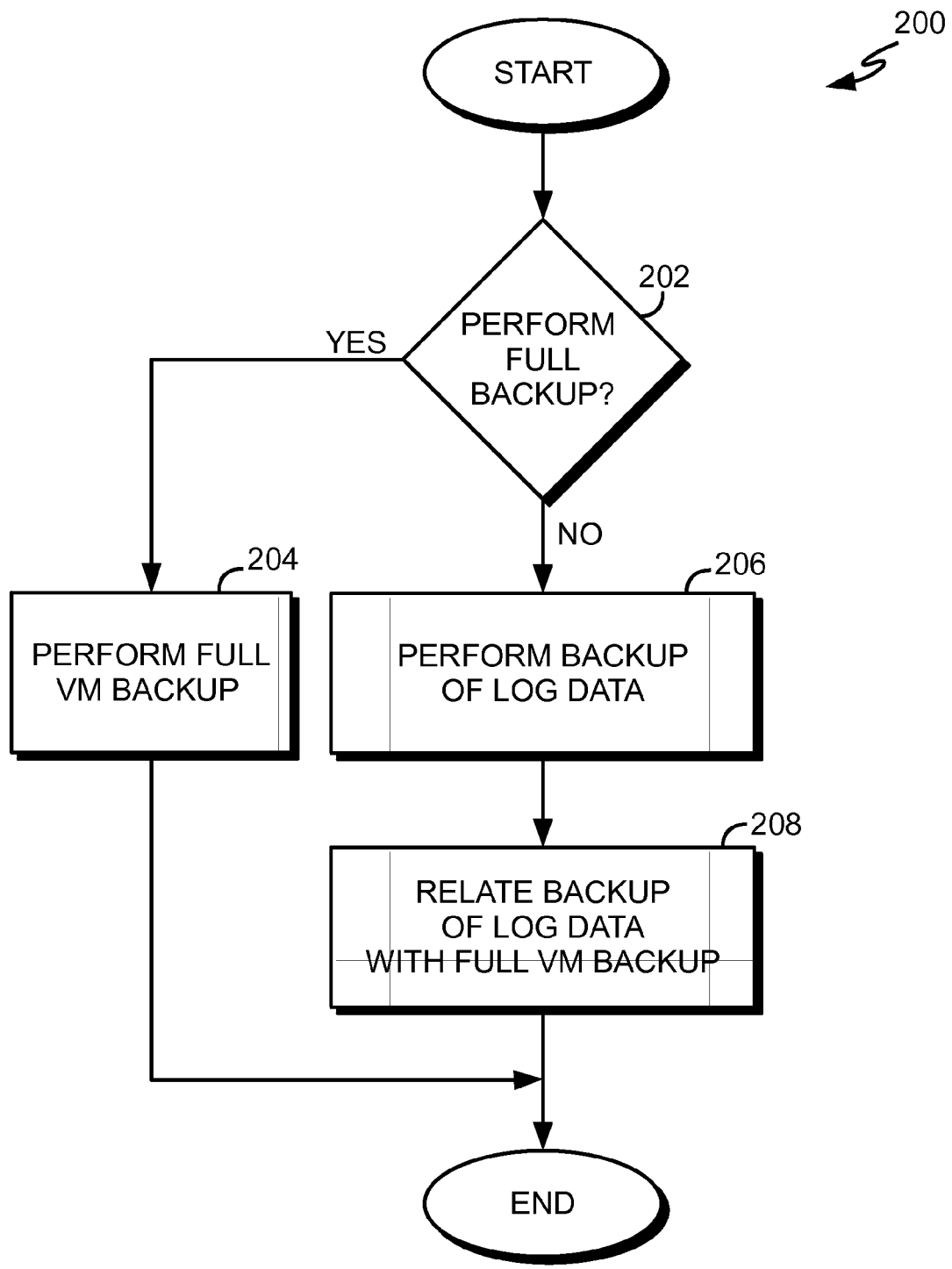
FIG. 2 is a flowchart illustrating operational steps of a backup scheme in accordance with an embodiment of the present invention.

FIG. 2 is a flowchart 200 illustrating operational steps of a backup scheme, in accordance with an embodiment of the present invention. In this exemplary embodiment, the operational steps shown in flowchart 200 are repeatedly performed at a specified interval according to a recovery point objective (RPO).

In step 202, client backup program 111 determines whether a full backup of virtual machine 116 should be performed. In this exemplary embodiment, client backup program 111 maintains a backup schedule that dictates whether a full backup of virtual machine 116 should be performed based on whether a specified amount of time has elapsed since the last full backup of virtual machine 116. Client backup program 111 may also query server backup program 104 to confirm whether a non-expired full backup of virtual machine 116 is stored in backup repository 108.

If, in step 202, client backup program 111 determines that a full backup of virtual machine 116 should be performed (i.e., the elapsed period of time since the last full backup exceeds a specified value), then, in step 204, a full backup of virtual machine 116 is performed. In this exemplary embodiment, client backup program 111 (e.g., DP for VMware) uses application programming interfaces (APIs) of virtualization program 114 (e.g., VMware) to take a snapshot of virtual machine 116 and back up virtual machine 116, including a full backup of application data (e.g., an SQL database) from database management program 120, to server backup program 104 via network 110. The term "snapshot", as used herein, refers to preserving a state of virtual machine 116 or a portion thereof at a particular point in time to enable a backup of data to occur without substantially interrupting input/output to data being backed up. For example, during the full backup, a snapshot of the entire virtual machine 116 is taken; in other contexts, as discussed later in this specification, a snapshot may be restricted to particular applications running on virtual machine 116, a particular volume on virtual disk(s) 122, etc. The ability to take snapshots in virtual machine 116 may be provided, for example, by virtualization program 114 and/or guest operating system 118. Server backup program 114 receives the data objects (e.g., as blocks of data) from virtualization program 114, creates entries for the data objects in relational data structure 106, and stores the backup objects in backup repository 108.

If, in step 202, client backup program 111 determines that a full backup of virtual machine 116 should be not be performed (i.e., the elapsed period of time since the last full backup is less than a specified value), then, in step 206, a backup of log data (e.g., SQL database transaction logs) from database management program 120 (e.g., Microsoft SQL Server) is performed. As discussed in greater detail with regard to FIGS. 3 through 6, backing up log data to backup repository 108 can be performed in a variety of ways.

In step 208, server backup program 104 relates backed up log data with the appropriate full backup of virtual machine 116 stored on backup repository 108. In this exemplary embodiment, server backup program 104 relates the entries in relational data structure 106 for the backed up log data with the entries in relational data structure 106 for the appropriate full backup version of virtual machine 116, such that an administrator of backup system 100, operating at a virtual machine-level, can later recover application data of database management program 120 (e.g., an SQL database as it existed at a particular point in time).

FIG. 3 is a flowchart 300 illustrating operational steps for performing a backup of log data stored on virtual disk(s) 122 in virtual machine 116, in accordance with an embodiment of the present invention. For example, the operational steps of flowchart 300 can be performed at step 206 of flowchart 200.

In step 302, in-guest backup agent 124 (e.g., DP for VMware) identifies database management program 120, whose logs and other application data are stored on virtual disk(s) 122. In general, however, embodiments of the present invention may be used to back up any applications running within virtual machine 116. For example, an administrator of backup system 100 may specify applications to be backed up, or in-guest backup agent 124 may identify, and present to the administrator, a list of running applications for his or her selection.

In step 304, in-guest backup agent 124 confirms that a compatible full backup of virtual machine 116 is stored on backup repository 108. A compatible full backup of virtual machine 116 is one which contains the correct data (i.e., data representing virtual machine 116 at the correct time, including a full backup of one or more databases of database management program 120) in the correct format (i.e., a data format that is compatible with a data format used for backups of the log data). In this exemplary embodiment, in-guest backup agent 124 queries server backup program 104, which in turn accesses relational data structure 106 to confirm that an appropriate full backup of virtual machine 116 is stored on backup repository 108 (e.g., confirmed by a unique virtual machine identifier, or VM UID). In-guest backup agent 124 further confirms that the full backup of virtual machine 116 was created by client backup program 111 (i.e., a compatible program) and is, therefore, in a compatible data format.

In step 306, in-guest backup agent 124 performs a backup of the log data from database management program 120 that is stored on virtual disk(s) 122. In this exemplary embodiment, in-guest agent 124 accesses the file system through guest operating system 118, copies the appropriate log files belonging to database management program 120, and transmits the log files to server backup program 104 via network 110. As previously discussed, server backup program 104 stores the backed up log files in backup repository 108 and relates those backed up log files with the appropriate full backup of virtual machine 116 in relational data structure 106.

Figure 4:
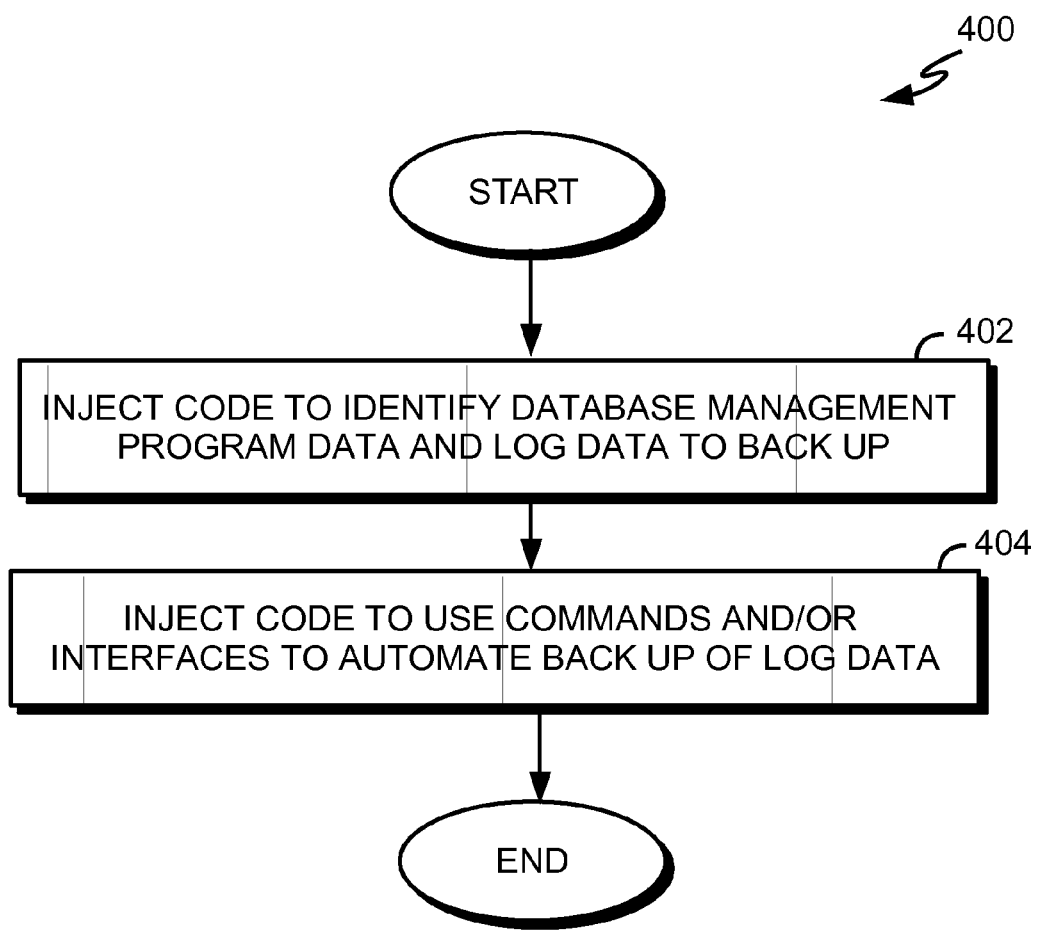
FIG. 4 is a flowchart illustrating operational steps for performing a backup of log data in a virtual machine in accordance with another embodiment of the present invention.

FIG. 4 is a flowchart 400 illustrating operational steps for performing a backup of log data stored on virtual disk(s) 122 in virtual machine 116, in accordance with another embodiment of the present invention. For example, the operational steps of flowchart 400 can be performed at step 206 of flowchart 200. In this exemplary embodiment, in-guest backup agent 124 is omitted from backup system 100. Instead, client backup program 111 injects code into virtual machine 116 in order to back up log data stored on virtual disk(s) 122.

In step 402, client backup program 111 injects code into virtual machine 116 to identify database management program 120, whose logs and other application data are stored on virtual disk(s) 122. As previously discussed, in other embodiments of the present invention, code may be injected to identify for backup other applications running within virtual machine 116.

In step 404, client backup program 111 injects code into virtual machine 116 to perform a backup of the log data from database management program 120 that is stored on virtual disk(s) 122. Unlike the embodiment of FIG. 3, however, the injected code uses commands and/or interfaces to automate back up of the log data. For example, where database management program 120 is implemented with Microsoft SQL Server and server backup program 104 is implemented with Tivoli Storage Manager, client backup program 111 can create backups of log data stored on virtual disk(s) 122 by injecting code to access SQL Server Virtual Device Interface (VDI), and client backup program 111 can then transmit the log data to server backup program 104 by injecting code to access appropriate Tivoli Storage Manager APIs. In another example, client backup program 111 can create backups of log data stored on virtual disk(s) 122 by injecting code to execute appropriate SQLCMD commands, or use Sql-Backup Server Management Objects. As previously discussed, server backup program 104 then stores the backed up log data in backup repository 108 and relates that backed up log data with the appropriate full backup of virtual machine 116 in relational data structure 106.

Accordingly, in this exemplary embodiment, log data is backed up without requiring installation of in-guest backup agent 124 on virtual machine 116. Thus, this exemplary embodiment can be used to simplify and automate back up of log data from virtual machine 116 for administrators of backup system 100 operating at the virtual machine-level.

Figure 5:
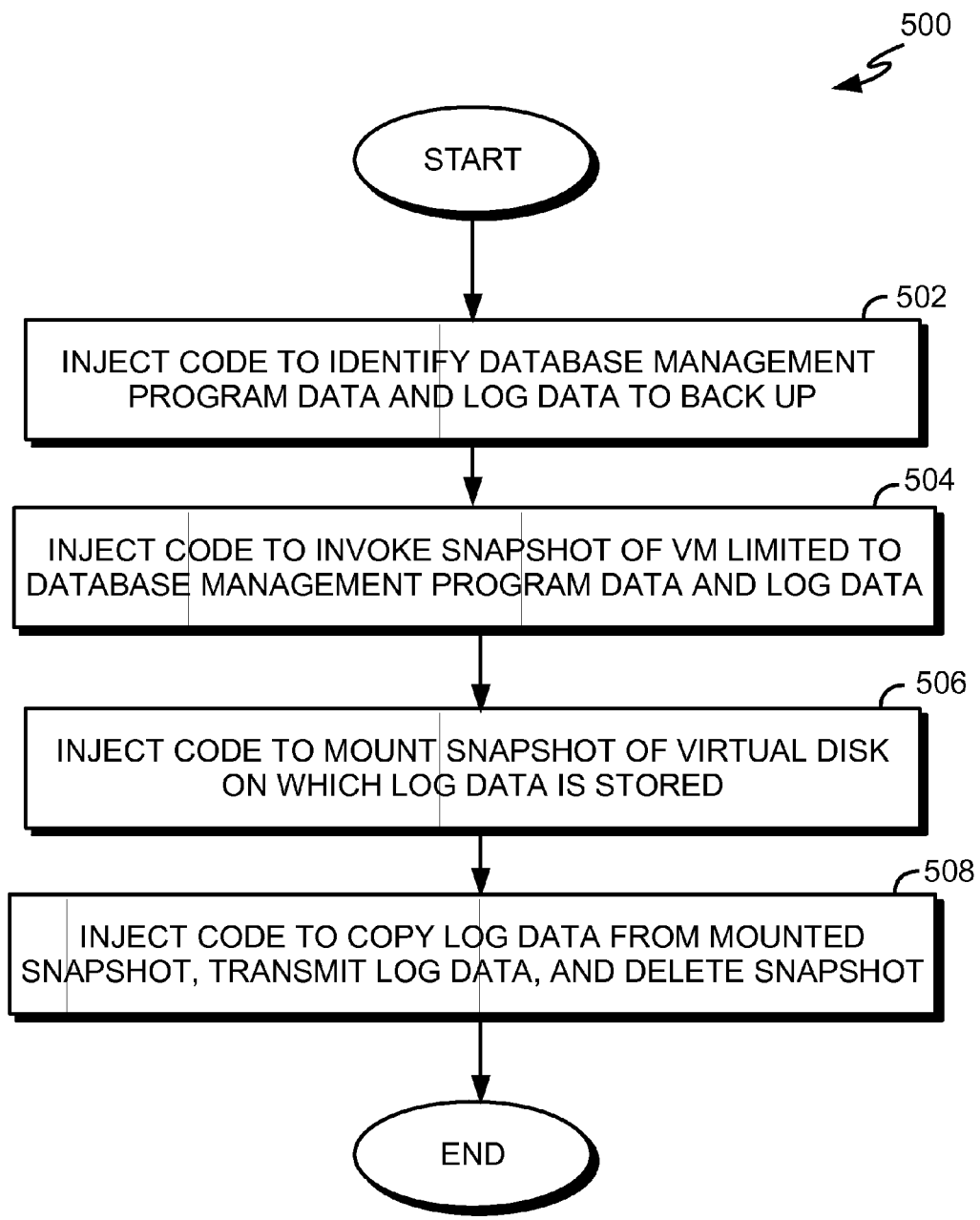
FIG. 5 is a flowchart illustrating operational steps for performing a backup of log data in a virtual machine in accordance with another embodiment of the present invention.

FIG. 5 is a flowchart 500 illustrating operational steps for performing a backup of log data stored on virtual disk(s) 122 in virtual machine 116, in accordance with another embodiment of the present invention. For example, the operational steps of flowchart 500 can be performed at step 206 of flowchart 200. In this exemplary embodiment, like the embodiment of FIG. 4, in-guest backup agent 124 is omitted from backup system 100, and client backup program 111 instead injects code into virtual machine 116 to back up log data stored on virtual disk(s) 122. Unlike the embodiment of FIG. 4, however, this exemplary embodiment uses snapshot techniques to back up log data. For illustrative purposes, the remaining discussion of this embodiment will use the example of Volume Shadow Copy Service (VSS) with Microsoft Windows® as guest operating system 118. As will be apparent to those of ordinary skill in the art, other snapshot techniques and services may be used depending on how virtual machine 116 and other elements of backup system 100 are implemented.

In step 502, client backup program 111 injects code into virtual machine 116 to identify database management program 120, whose logs and other application data are stored on virtual disk(s) 122.

In step 504, client backup program 111 injects code (i.e., using VMware or other virtualization product APIs) into virtual machine 116 that invokes a VSS snapshot of virtual machine 116 that is limited to database management program 120. More specifically, client backup program 111 injects code that restricts the VSS snapshot to the writer application of database management program 120 (e.g., SQL writer application) to freeze the appropriate application data for database management program 120 and virtual disk(s) 122 on which the log data is stored (e.g., VMDK2 in the example discussed earlier).

In step 506, client backup program 111 injects code into virtual machine 116 to mount the snapshot of the virtual disk(s) 122 on which the log data is stored.

In step 508, client backup program 111 injects code into virtual machine 116 to copy log data (i.e., in the form of log files) from the mounted snapshot, transmit the log data to server backup program 104, and delete the snapshot. As previously discussed, server backup program 104 then stores the backed up log data in backup repository 108 and relates that backed up log data with the appropriate full backup of virtual machine 116 in relational data structure 106.

Figure 6:
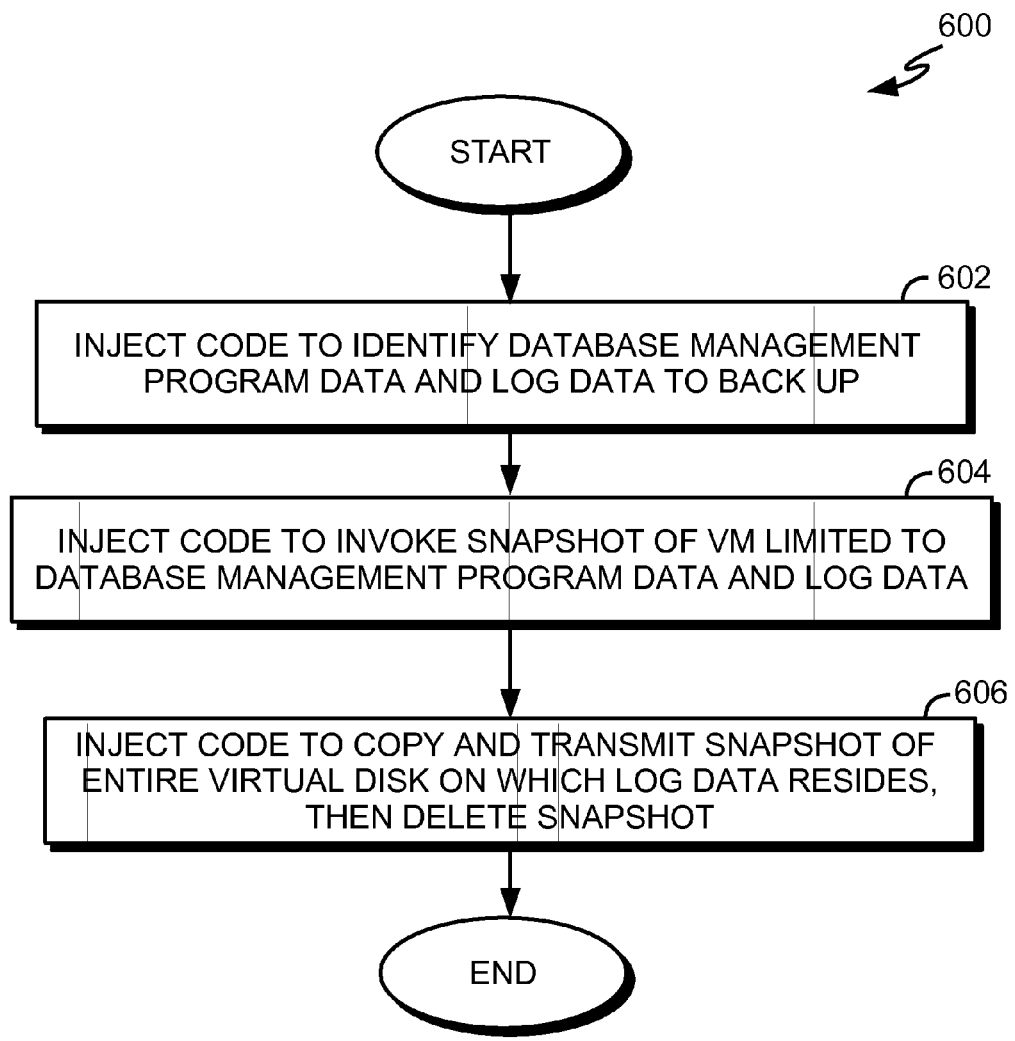
FIG. 6 is a flowchart illustrating operational steps for performing a backup of log data in a virtual machine in accordance with another embodiment of the present invention.

FIG. 6 is a flowchart 600 illustrating operational steps for performing a backup of log data stored on virtual disk(s) 122 in virtual machine 116, in accordance with another embodiment of the present invention. For example, the operational steps of flowchart 600 can be performed at step 206 of flowchart 200. In this exemplary embodiment, like the embodiment of FIG. 5, client backup program 111 injects code into virtual machine 116 to back up log data stored on virtual disk(s) 122 using snapshot techniques. In this exemplary embodiment, however, the entire virtual disk(s) 122 on which the logs reside is backed up, rather than just the log files. Again, for illustrative purposes, the remaining discussion of this embodiment will use the example of Volume Shadow Copy Service (VSS) with Microsoft Windows® as guest operating system 118.

In step 602, client backup program 111 injects code into virtual machine 116 to identify database management program 120, whose logs and other application data are stored on virtual disk(s) 122.

In step 604, client backup program 111 injects code (i.e., using VMware or other virtualization product APIs) into virtual machine 116 that invokes a VSS snapshot of virtual machine 116 restricted to the writer application of database management program 120 (e.g., SQL writer application) in order to freeze the appropriate application data for database management program 120 and virtual disk(s) 122 on which the log data is stored (e.g., VMDK2 in the example discussed earlier).

In step 606, client backup program 111 injects code into virtual machine 116 to back up and transmit to server backup program 104 the snapshot of the entire virtual disk(s) 122 on which the log data is stored, and then delete the snapshot. As previously discussed, server backup program 104 then stores the backed up log data in backup repository 108 and relates that backed up log data with the appropriate full backup of virtual machine 116 in relational data structure 106.

Accordingly, while both this embodiment and the embodiment of FIG. 5 use a snapshot to back up log data, this embodiment can increase the efficiency with which the logs can be backed up because it eliminates processing and logistical overhead needed to mount the snapshot and separately copy and track the log data.

FIG. 7 is a flowchart 700 illustrating operational steps for recovering a database from backup repository 108 to virtual machine 116, in accordance with an embodiment of the present invention. It should be understood that the operational steps depicted in flowchart 700 may also be used to recover a more granular item, such as a table, message, or other file.

In step 702, in-guest recovery agent 126 queries backup server computer system 102 to identify available recovery points for the database based on full backups of virtual machine 116 and backups of log data stored on backup repository 108 (i.e., based on time points associated with backups in the backup inventory that correspond to time points when the backups were taken). In-guest recovery agent 126 can then present the available recovery points to the user of backup system 100. Furthermore, the associations in relational data structure 106 between the full backups of virtual machine 116 and the appropriate backups of log data enable in-guest recovery agent 126 to represent the available recovery points to the user independent of the method used to create the recovery point.

In step 704, in-guest recovery agent 126 receives a selection from the user of a recovery point for the database and any additional options. For example, the user may select a recovery point in the form of a particular date/time, backup version, or some other format.

In step 706, in-guest recovery agent 126 passes the selection to client backup program 111 to identify the full backup of virtual machine 116 and backup of log data that are needed to satisfy the recovery point. For example, if the user chooses a recovery point that is between a full backup of virtual machine 116 taken at t0 and a backup of log data that was taken at t1, client backup program 111 would identify the same.

In step 708, client backup program 111 requests, from server backup program 104 via network 110, the identified full backup of virtual machine 116 and backup of log data, which are received by host computer system 112.

In step 710, client backup program 111 mounts the received full backup of virtual machine 116, which, in this exemplary embodiment, is in the form of a snapshot, and initiates recovery from that point in time. Client backup program 111 optionally mounts the received backup of log data, depending on its format. For example, client backup program 111 also mounts the received virtual disk(s) 122 to access the backed up log data where the log data was backed up in the form of a snapshot of virtual disk(s) 122 (e.g., the embodiment of FIG. 6).

In step 712, client backup program 111 provides the backed up log data to database management program 120, which may then apply the log data to recover the database to the point in time selected by the user.

Figure 8:
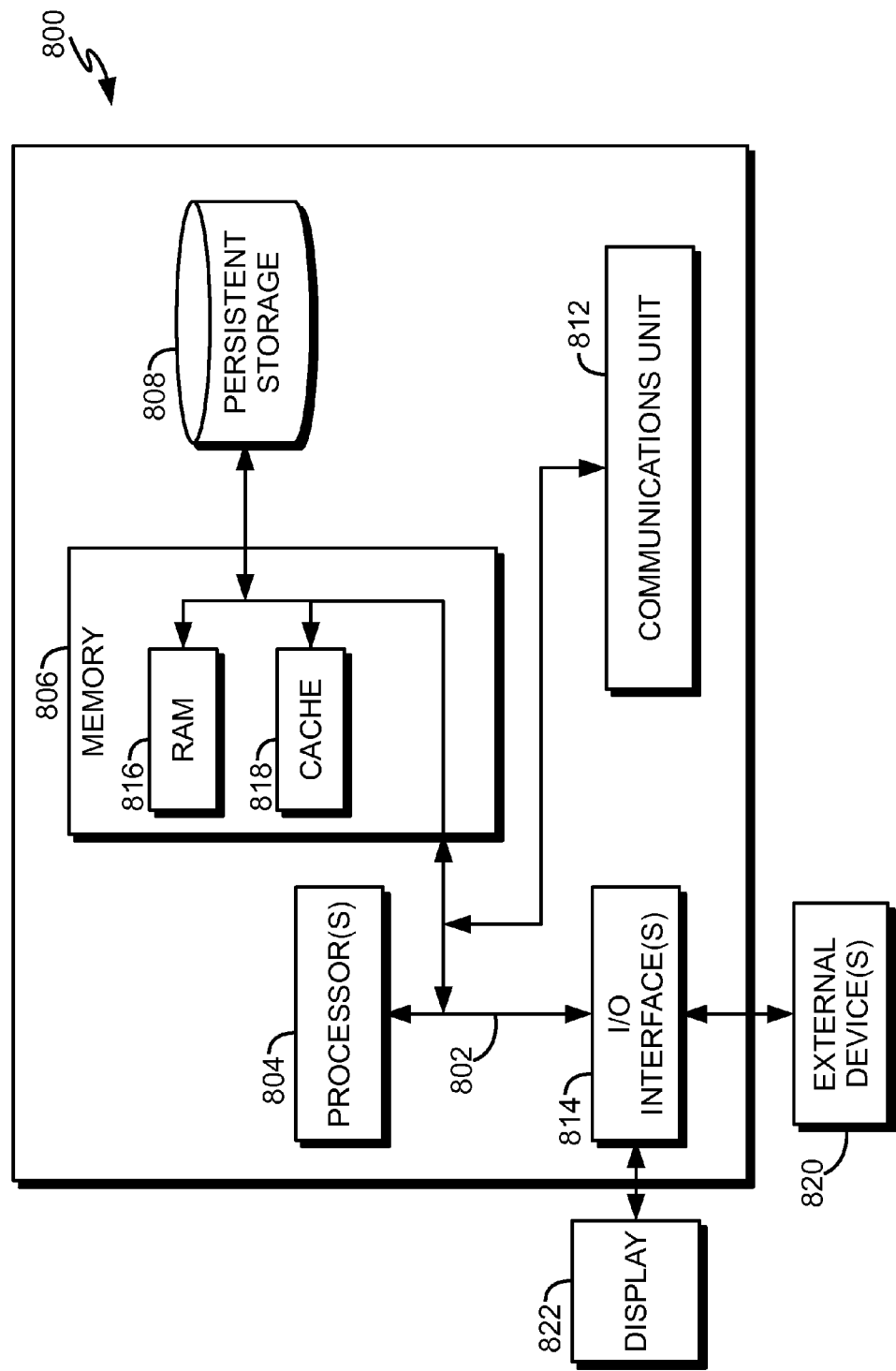
FIG. 8 is a block diagram of internal and external components of the computer systems of FIG. 1 in accordance with an embodiment of the present invention.

FIG. 8 is a block diagram of internal and external components of a computer system 800, which is representative the computer systems of FIG. 1, in accordance with an embodiment of the present invention. It should be appreciated that FIG. 8 provides only an illustration of one implementation and does not imply any limitations with regard to the environments in which different embodiments may be implemented. In general, the components illustrated in FIG. 8 are representative of any electronic device capable of executing machine-readable program instructions. Examples of computer systems, environments, and/or configurations that may be represented by the components illustrated in FIG. 8 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 800 includes communications fabric 802, which provides for communications between one or more processors 804, memory 806, persistent storage 808, communications unit 812, and one or more input/output (I/O) interfaces 814. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 816 and cache memory 818. In general, memory 806 can include any suitable volatile or non-volatile computer-readable storage media. Software (e.g., server backup program 104, virtualization program 114, etc.) is stored in persistent storage 808 for execution and/or access by one or more of the respective processors 804 via one or more memories of memory 806.

Persistent storage 808 may include, for example, a plurality of magnetic hard disk drives. Alternatively, or in addition to magnetic hard disk drives, persistent storage 808 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 808 can also be removable. For example, a removable hard drive can be used for persistent storage 808. Other examples include optical and magnetic disks, thumb drives, and smart cards that are inserted into a drive for transfer onto another computer-readable storage medium that is also part of persistent storage 808.

Communications unit 812 provides for communications with other computer systems or devices via a network (e.g., network 110). In this exemplary embodiment, communications unit 812 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 812 (e.g., via the Internet, a local area network or other wide area network). From communications unit 812, the software and data can be loaded onto persistent storage 808.

One or more I/O interfaces 814 allow for input and output of data with other devices that may be connected to computer system 800. For example, I/O interface 814 can provide a connection to one or more external devices 820 such as a keyboard, computer mouse, touch screen, virtual keyboard, touch pad, pointing device, or other human interface devices. External devices 820 can also include portable computer-readable storage media such as, for example, thumb drives, portable optical or magnetic disks, and memory cards. I/O interface 814 also connects to display 822.

Display 822 provides a mechanism to display data to a user and can be, for example, a computer monitor. Display 822 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product comprising:
one or more computer readable storage media and program instructions stored on the one or more computer readable storage media, the program instructions comprising:
program instructions to identify an application executing in a guest operating system in a virtual machine and log data associated with the application, wherein the log data represents changes to data of SQL database transaction logs that have occurred since a point in time;
program instructions to query a relational data structure to determine when a full backup of the virtual machine has been generated and stored;
program instructions, responsive to generation of the full backup of the virtual machine, to create an incremental backup of the virtual machine;
program instructions to store the incremental backup of the virtual machine;
program instructions to confirm that the full and incremental backups of the virtual machine have been stored in the one or more storage devices, and that the full and incremental backups of the virtual machine are in a data format that is compatible with a data format used to back up the log data, via the relational data structure;
program instructions to create a backup of the log data;
program instructions to store the backup of the log data; and
program instructions to relate in the relational data structure the full and incremental backups of the virtual machine and the backup of the log data.

2. The computer program product of claim 1, wherein the application is a database management program and the log data comprises a transaction log describing modifications made to an SQL database.

3. The computer program product of claim 1, wherein the program instructions to create a backup of the log data associated with the application comprise:
program instructions to execute in the guest operating system, one or more programs to access a file system of the guest operating system; and
program instructions to execute in the guest operating system, one or more programs to copy one or more log files containing the log data.

4. The computer program product of claim 1, wherein the program instructions to create a backup of the log data associated with the application comprise:
program instructions to execute outside of the guest operating system, one or more programs to inject code into the virtual machine to create a backup of the log data associated with the application.

5. The computer program product of claim 1, wherein the program instructions to create a backup of the log data associated with the application comprise:
program instructions to execute outside of the guest operating system, one or more programs to inject code into the virtual machine to invoke a snapshot of the virtual machine; and
program instructions to execute outside of the guest operating system, one or more programs to inject code into the virtual machine to copy the log data from the snapshot of the virtual machine, wherein the log data is associated with the application.

6. The computer program product of claim 1, wherein the program instructions to create a backup of the log data associated with the application comprise:
program instructions to execute outside of the guest operating system, one or more programs to inject code into the virtual machine to invoke a snapshot of one or more virtual disks of the virtual machine on which the log data reside;
program instructions to execute outside of the guest operating system, one or more programs to inject code into the virtual machine to mount the snapshot of the one or more virtual disks of the virtual machine on which the log data reside; and
program instructions to execute outside of the guest operating system, one or more programs to inject code into the virtual machine to copy the log data from the mounted snapshot.

7. The computer program product of claim 1, wherein the program instructions stored on the one or more computer readable storage media further comprise:
program instructions to identify one or more available recovery points for recovering data based on time points associated with backups of the virtual machine stored in the one or more storage devices and backups of the log data stored in the one or more storage devices;
program instructions to receive a selection of an available recovery point from the one or more available recovery points;
program instructions to identify a backup of the virtual machine and a backup of the log data that are needed to satisfy the selected recovery point;
program instructions to receive from the one or more storage devices, the identified backup of the virtual machine and the identified backup of the log data that are needed to satisfy the selected recovery point;
program instructions to mount the identified backup of the virtual machine and initiating recovery of the application; and
program instructions to provide to the application the log data from the identified backup of the log data.

8. A computer system comprising:
one or more computer processors;
one or more computer readable storage media;
program instructions stored on the computer readable storage media for execution by at least one of the one or more processors, the program instructions comprising:
program instructions to identify an application executing in a guest operating system in a virtual machine and log data associated with the application, wherein the log data represents changes to data of SQL database transaction logs that have occurred since a point in time;
program instructions to query a relational data structure to determine when a full backup of the virtual machine has been generated and stored;
program instructions, responsive to generation of the full backup of the virtual machine, to create an incremental backup of the virtual machine;
program instructions to store the incremental backup of the virtual machine;
program instructions to confirm that the full and incremental backups of the virtual machine have been stored in the one or more storage devices and that the full and incremental backups of the virtual machine are in a data format that is compatible with a data format used to back up the log data, via the relational data structure;
program instructions to create a backup of the log data;
program instructions to store the backup of the log data; and
program instructions to relate in the relational data structure the full and incremental backups of the virtual machine and the backup of the log data.

9. The system of claim 8, wherein the application is a database management program and the log data comprises a transaction log describing modifications made to an SQL database.

10. The system of claim 8, wherein the program instructions to create a backup of the log data associated with the application comprise:
program instructions to execute outside of the guest operating system, one or more programs to inject code into the virtual machine to create a backup of the log data associated with the application.

11. The system of claim 8, wherein the program instructions to create a backup of the log data associated with the application comprise:
program instructions to execute outside of the guest operating system, one or more programs to inject code into the virtual machine to invoke a snapshot of the virtual machine; and
program instructions to execute outside of the guest operating system, one or more programs to inject code into the virtual machine to copy the log data from the snapshot of the virtual machine, wherein the log data is associated with the application.

12. The system of claim 8, wherein the program instructions to create a backup of the log data associated with the application comprise:
program instructions to execute outside of the guest operating system, one or more programs to inject code into the virtual machine to invoke a snapshot of one or more virtual disks of the virtual machine on which the log data reside;
program instructions to execute outside of the guest operating system, one or more programs to inject code into the virtual machine to mount the snapshot of the one or more virtual disks of the virtual machine on which the log data reside; and
program instructions to execute outside of the guest operating system, one or more programs to inject code into the virtual machine to copy the log data from the mounted snapshot.

13. The system of claim 8, wherein the program instructions stored on the computer readable storage media for execution by at least one of the one or more processors further comprise:
program instructions to identify one or more available recovery points for recovering data based on time points associated with backups of the virtual machine stored in the one or more storage devices and backups of the log data stored in the one or more storage devices;
program instructions to receive a selection of an available recovery point from the one or more available recovery points;
program instructions to identify a backup of the virtual machine and a backup of the log data that are needed to satisfy the selected recovery point;
program instructions to receive from the one or more storage devices, the identified backup of the virtual machine and the identified backup of the log data that are needed to satisfy the selected recovery point;
program instructions to mount the identified backup of the virtual machine and initiating recovery of the application; and
program instructions to provide to the application the log data from the identified backup of the log data.

* * * * *